United States Patent
Guidry

(10) Patent No.: US 11,391,109 B2
(45) Date of Patent: Jul. 19, 2022

(54) FRACTURING MANIFOLD SYSTEMS AND METHODS

(71) Applicant: Cameron International Corporation, Houston, TX (US)

(72) Inventor: Kirk P. Guidry, Cypress, TX (US)

(73) Assignee: Cameron International Corporation, Houston, TX (US)

( * ) Notice: Subject to any disclaimer, the term of this patent is extended or adjusted under 35 U.S.C. 154(b) by 0 days.

(21) Appl. No.: 17/134,652

(22) Filed: Dec. 28, 2020

(65) Prior Publication Data

US 2021/0363851 A1     Nov. 25, 2021

Related U.S. Application Data

(63) Continuation of application No. 16/542,955, filed on Aug. 16, 2019, now Pat. No. 10,876,371, which is a
(Continued)

(51) Int. Cl.
*E21B 41/00* (2006.01)
*E21B 33/068* (2006.01)
(Continued)

(52) U.S. Cl.
CPC ............ *E21B 33/068* (2013.01); *E21B 17/05* (2013.01); *E21B 33/03* (2013.01); *E21B 34/02* (2013.01);
(Continued)

(58) Field of Classification Search
CPC ........ E21B 33/03; E21B 33/068; E21B 41/00; E21B 43/26; F16L 15/02; F16L 27/12751; F16L 2201/30; G05D 7/0664
See application file for complete search history.

(56) References Cited

U.S. PATENT DOCUMENTS

| 1,615,536 A | 1/1927 | Del Mar |
| 2,753,940 A | 7/1956 | Bonner |

(Continued)

FOREIGN PATENT DOCUMENTS

| CA | 2178856 A1 | 12/1997 |
| CA | 2654848 A1 | 8/2010 |
| WO | 2009154881 A1 | 12/2009 |

OTHER PUBLICATIONS

Perry's Chemical Engineers' Handbook, 6th ed., Robert H. Perry and Don Green (eds), 1984, cover, title page, copyright page and pp. 6-1, 6-41, 6-45, 6-46, 6-54, and 6-55, McGraw-Hill Inc., New York, United States of America.
(Continued)

*Primary Examiner* — Taras P Bemko
*Assistant Examiner* — Ronald R Runyan
(74) *Attorney, Agent, or Firm* — Eubanks PLLC

(57) ABSTRACT

A fracturing system is provided. In one embodiment, the fracturing system includes a fracturing manifold for routing fracturing fluid to multiple wells. The fracturing manifold can be coupled via fluid conduits to fracturing trees installed at the wells. In some cases, each fracturing tree that is coupled to the fracturing manifold is coupled by at least one rigid fluid conduit. The fracturing manifold can include a trunk line that provides fracturing fluid to multiple outlet branches, which can include valves for controlling flow of fracturing fluid to wells downstream of the valves. Additional systems, devices, and methods are also disclosed.

20 Claims, 11 Drawing Sheets

Related U.S. Application Data continuation of application No. 16/206,160, filed on Nov. 30, 2018, now Pat. No. 10,385,645, which is a continuation of application No. 16/154,461, filed on Oct. 8, 2018, now Pat. No. 10,385,643, which is a continuation of application No. 15/375,558, filed on Dec. 12, 2016, now Pat. No. 10,094,195, which is a continuation of application No. 14/752,864, filed on Jun. 27, 2015, now Pat. No. 9,518,430, which is a continuation of application No. 13/783,009, filed on Mar. 1, 2013, now Pat. No. 9,068,450, which is a continuation-in-part of application No. 13/243,252, filed on Sep. 23, 2011, now Pat. No. 8,978,763.

(60) Provisional application No. 61/759,127, filed on Jan. 31, 2013.

(51) Int. Cl.
| | |
|---|---|
| E21B 43/26 | (2006.01) |
| F16L 15/02 | (2006.01) |
| E21B 33/03 | (2006.01) |
| E21B 34/02 | (2006.01) |
| F16L 27/12 | (2006.01) |
| E21B 17/05 | (2006.01) |
| G05D 7/06 | (2006.01) |

(52) U.S. Cl.
CPC .............. *E21B 41/00* (2013.01); *E21B 43/26* (2013.01); *F16L 15/02* (2013.01); *F16L 27/12751* (2019.08); *G05D 7/0664* (2013.01); *F16L 2201/30* (2013.01)

(56) References Cited

U.S. PATENT DOCUMENTS

| | | | |
|---|---|---|---|
| 3,233,668 | A | 2/1966 | Hamilton et al. |
| 3,993,100 | A | 11/1976 | Pollard et al. |
| 4,355,961 | A | 10/1982 | Riggs |
| 4,366,864 | A | 1/1983 | Gibson et al. |
| 4,452,312 | A | 6/1984 | Roblin |
| 4,559,716 | A | 12/1985 | Daughtry et al. |
| 4,570,673 | A | 2/1986 | Kendrick et al. |
| 4,603,887 | A | 8/1986 | Mayfield et al. |
| 4,632,432 | A | 12/1986 | Reneau |
| 4,767,136 | A | 8/1988 | Lehmann |
| 4,821,564 | A | 4/1989 | Pearson et al. |
| 4,828,033 | A | 5/1989 | Frison |
| 4,998,756 | A | 3/1991 | Hart |
| 5,195,589 | A | 3/1993 | Mota et al. |
| 5,244,045 | A | 9/1993 | Mota |
| 5,421,408 | A | 6/1995 | Stoisits et al. |
| 5,803,506 | A | 9/1998 | Argersinger et al. |
| 6,003,604 | A | 12/1999 | Wilkins |
| 6,234,030 | B1 | 5/2001 | Butler |
| 6,364,024 | B1 | 4/2002 | Dallas |
| 6,893,558 | B1 | 5/2005 | McGee et al. |
| 7,841,394 | B2 | 11/2010 | McNeel et al. |
| 8,398,122 | B2 | 3/2013 | Crompton et al. |
| 8,474,521 | B2 | 7/2013 | Kajaria et al. |
| 8,839,867 | B2 | 9/2014 | Conrad |
| 8,905,056 | B2 | 12/2014 | Kendrick |
| 8,978,763 | B2 | 3/2015 | Guidry |
| 9,068,450 | B2 | 6/2015 | Guidry |
| 9,127,545 | B2 | 9/2015 | Kajaria et al. |
| 9,222,345 | B2 | 12/2015 | Conrad |
| 9,255,469 | B2 | 2/2016 | Conrad |
| 9,518,430 | B2 | 12/2016 | Guidry |
| 9,631,469 | B2 | 4/2017 | Guidry et al. |
| 9,903,190 | B2 | 2/2018 | Conrad et al. |
| 9,915,132 | B2 | 3/2018 | Conrad |
| 9,932,800 | B2 | 4/2018 | Guidry |
| 10,094,195 | B2 | 10/2018 | Guidry |
| 10,132,146 | B2 | 11/2018 | Guidry |
| 10,323,475 | B2 | 6/2019 | Christopherson et al. |
| 10,385,643 | B2 | 8/2019 | Guidry |
| 10,385,645 | B2 | 8/2019 | Guidry |
| 10,385,662 | B2 | 8/2019 | Conrad |
| 10,487,637 | B2 | 11/2019 | Guidry et al. |
| 10,787,879 | B2 | 9/2020 | Christopherson et al. |
| 10,876,371 | B2 | 12/2020 | Guidry |
| 10,934,816 | B2 | 3/2021 | Conrad |
| 2003/0205378 | A1 | 11/2003 | Wellington et al. |
| 2003/0205385 | A1 | 11/2003 | Duhn et al. |
| 2004/0251020 | A1 | 12/2004 | Smith |
| 2006/0207763 | A1 | 9/2006 | Hofman |
| 2007/0125544 | A1 | 6/2007 | Robinson et al. |
| 2007/0227722 | A1 | 10/2007 | Atencio |
| 2008/0277120 | A1 | 11/2008 | Hickie |
| 2009/0114392 | A1 | 5/2009 | Tolman et al. |
| 2009/0194273 | A1 | 8/2009 | Surjaatmadja et al. |
| 2009/0261575 | A1 | 10/2009 | Bull et al. |
| 2010/0025034 | A1 | 2/2010 | Donald et al. |
| 2010/0032031 | A1 | 2/2010 | Neal |
| 2010/0051261 | A1 | 3/2010 | Koleilat et al. |
| 2010/0154894 | A1 | 6/2010 | Kotapish et al. |
| 2010/0263872 | A1 | 10/2010 | Bull et al. |
| 2010/0300672 | A1 | 12/2010 | Childress et al. |
| 2011/0011599 | A1 | 1/2011 | Nguyen et al. |
| 2011/0030963 | A1 | 2/2011 | Demong et al. |
| 2011/0048695 | A1 | 3/2011 | Cherewyk et al. |
| 2011/0048698 | A1 | 3/2011 | McGuire et al. |
| 2011/0108275 | A1 | 5/2011 | Borak et al. |
| 2011/0114320 | A1 | 5/2011 | Sponchia et al. |
| 2011/0132596 | A1 | 6/2011 | Yeh et al. |
| 2011/0259584 | A1 | 10/2011 | Broussard, II |
| 2012/0152564 | A1 | 6/2012 | Peltier |
| 2012/0181015 | A1 | 7/2012 | Kajaria et al. |
| 2012/0181016 | A1 | 7/2012 | Kajaria et al. |
| 2012/0181030 | A1 | 7/2012 | Kajaria et al. |
| 2012/0181785 | A1 | 7/2012 | Kajaria et al. |
| 2012/0242081 | A1 | 9/2012 | Keays et al. |
| 2013/0032328 | A1 | 2/2013 | Guidry et al. |
| 2014/0238683 | A1 | 8/2014 | Korach et al. |
| 2015/0159458 | A1 | 6/2015 | Tan et al. |
| 2015/0275629 | A1 | 10/2015 | Hatton |
| 2015/0354313 | A1 | 12/2015 | McClinton et al. |
| 2018/0187662 | A1 | 7/2018 | Hill et al. |
| 2018/0291718 | A1 | 10/2018 | Conrad et al. |
| 2019/0383125 | A1 | 12/2019 | Koricanek |

OTHER PUBLICATIONS

API Specification 6A: Specification for Wellhead and Christmas Tree Equipment, 17th ed., 1999, American Petroleum Institute, United States of America.

API Specification 6A: Specification for Wellhead and Christmas Tree Equipment, 19th ed., 2004, American Petroleum Institute, United States of America.

Power Chokes, L.P., Engineering Drawings dated 2003-2004 (3 pages).

Catalog for Pressure Control Equipment, Feb. 1, 2005, WOODCO USA, Houston, Texas, United States of America.

Bommer, Paul, A Primer of Oilwell Drilling, 7th ed., 2008, cover, title page, copyright page and pp. 177, 213, and 234, The University of Texas at Austin, United States of America.

Demong, Karl, et al., "Shale Energy: Developing The Horn River-Re-engineering surface equipment and processes to support continuous fracing", World Oil, Oct. 2010, vol. 231, No. 10, Gulf Publishing Company, Houston, Texas, United States of America.

Slayden, Bruce, et al., *Cameron International Corporation v. Nitro Fluids L.L.C.*, United States District Court for the Southern District of Texas, Case No. 4:18-cv-02533, Complaint filed Jul. 20, 2018.

Hall, James, et al., *Nitro Fluids, L.L.C. v. Cameron International Corporation*, Case IPR2019-00804, U.S. Pat. No. 9,903,190, Petition for Inter Partes Review filed Mar. 8, 2019.

Hall, James, et al., *Nitro Fluids, L.L.C, v. Cameron International Corporation*, Case IPR2019-00852, U.S. Pat. No. 9,932,800, Petition for Inter Partes Review filed Mar. 20, 2019.

(56) References Cited

OTHER PUBLICATIONS

Keville, John, et al., *Cameron International Corporation* v. *Butch's Rathole & Anchor Service, Inc.,* United States District Court for the Western District of Texas, Case No. 6:20-cv-00124, Complaint filed Feb. 17, 2020.

Keville, John, et al., *Cameron International Corporation* v. *Nitro Fluids L.L.C.,* United States District Court for the Western District of Texas, Case No. 6:20-cv-00125, Complaint filed Feb. 17, 2020.

Hall, James, et al., *Nitro Fluids, L.L.C.* v. *Cameron International Corporation,* Case IPR2020-00691, U.S. Pat. No. 10,094,195, Petition for Inter Partes Review filed Mar. 9, 2020.

*Nitro Fluids, L.L.C.* v. *Cameron International Corporation,* Case IPR2019-00852, U.S. Pat. No. 9,932,800, Final Written Decision dated Sep. 2, 2020.

*Cameron International Corporation* v. *Nitro Fluids L.L.C.,* United States Court of Appeals for the Federal Circuit, Docket No. 2021-1183, Notices of Docketing and Appeal dated Nov. 9, 2020.

Christopherson et al., U.S. Appl. No. 17/034,130, filed Sep. 28, 2020.

Conrad et al., U.S. Appl. No. 17/142,574, filed Jan. 6, 2021.

Conrad, U.S. Appl. No. 17/188,470, filed Mar. 1, 2021.

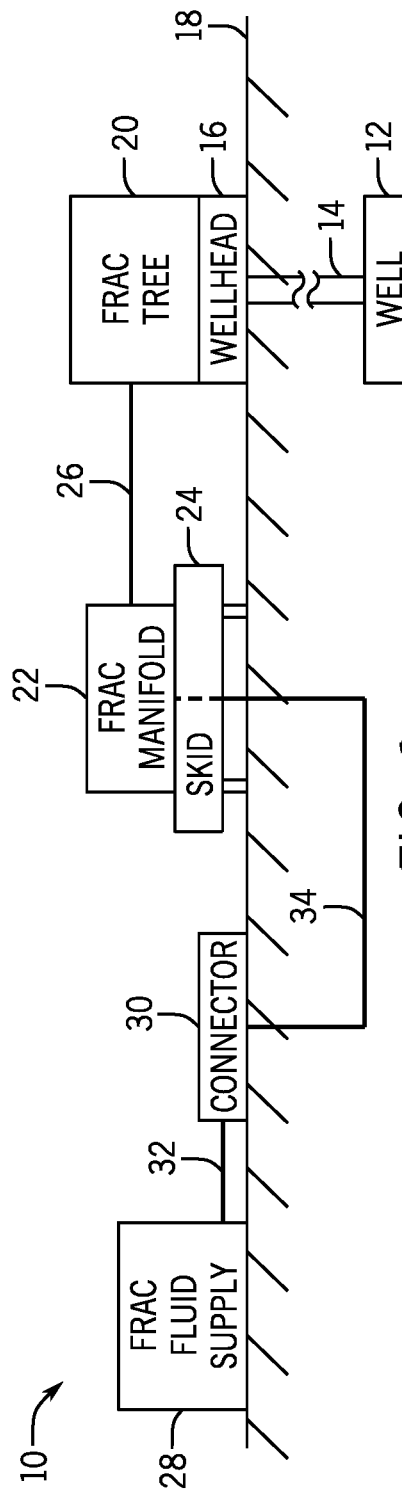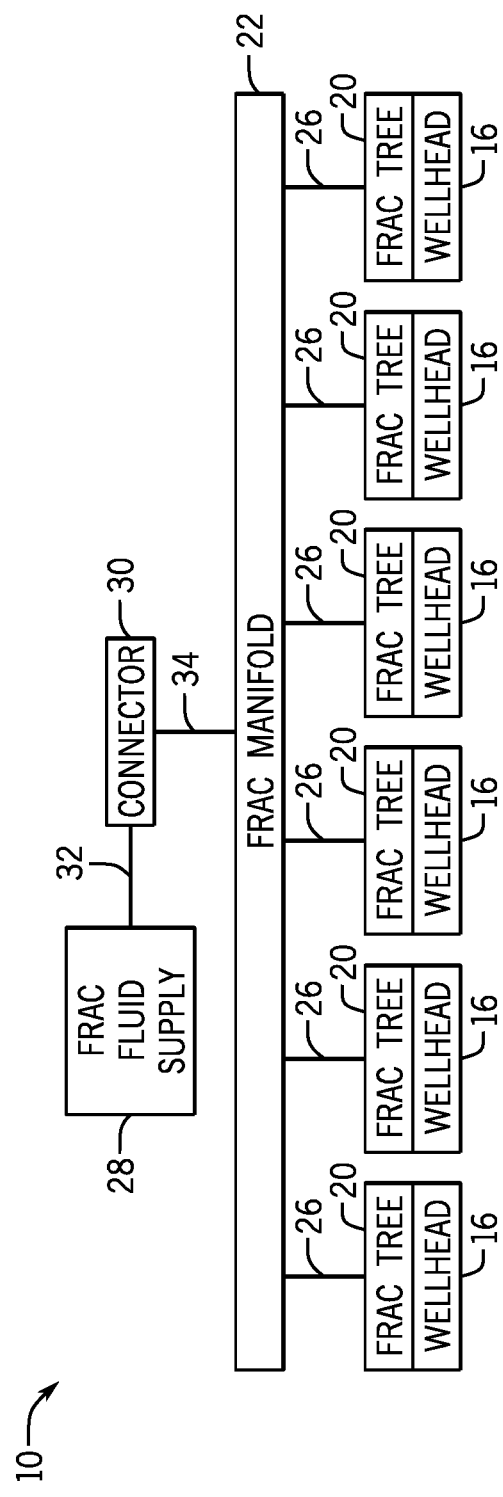

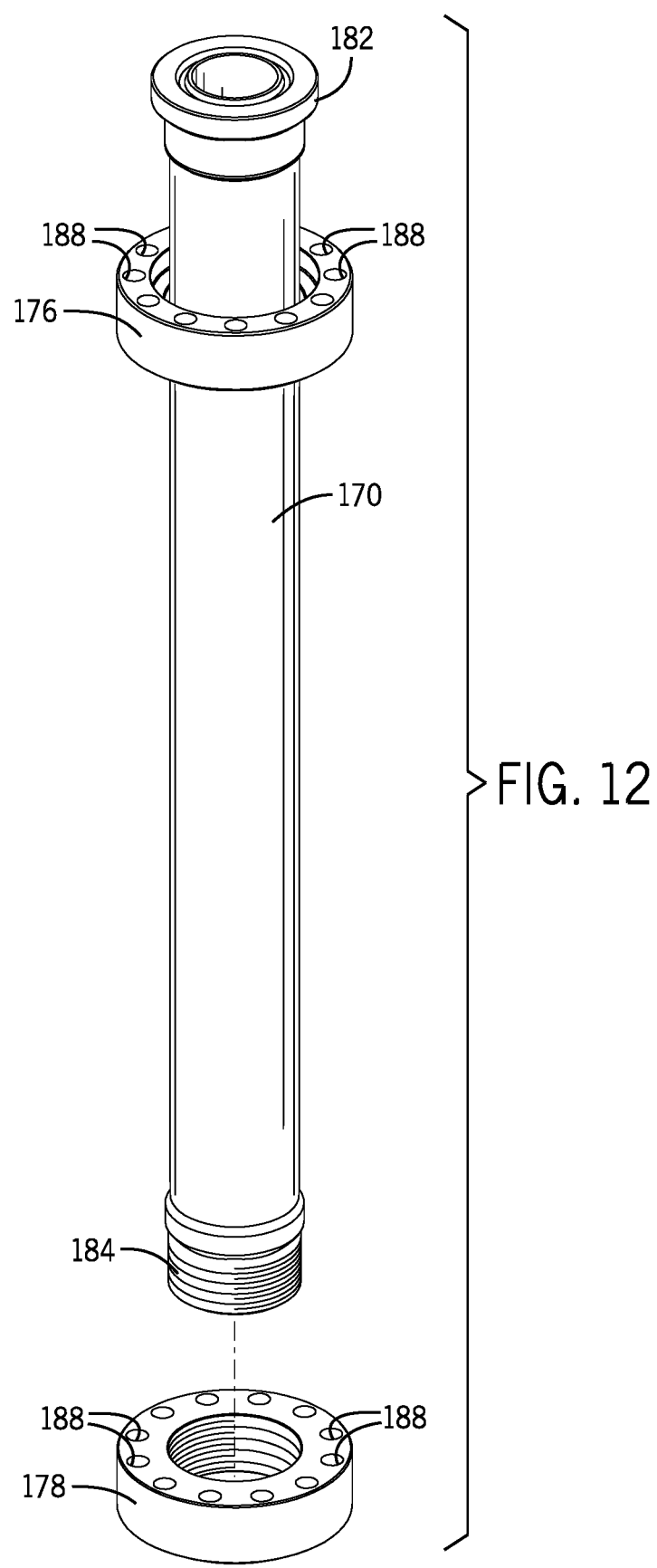

FRACTURING MANIFOLD SYSTEMS AND METHODS

BACKGROUND

This section is intended to introduce the reader to various aspects of art that may be related to various aspects of the presently described embodiments. This discussion is believed to be helpful in providing the reader with background information to facilitate a better understanding of the various aspects of the present embodiments. Accordingly, it should be understood that these statements are to be read in this light, and not as admissions of prior art.

In order to meet consumer and industrial demand for natural resources, companies often invest significant amounts of time and money in searching for and extracting oil, natural gas, and other subterranean resources from the earth. Particularly, once a desired subterranean resource is discovered, drilling and production systems are often employed to access and extract the resource. These systems may be located onshore or offshore depending on the location of a desired resource. Further, such systems generally include a wellhead assembly through which the resource is extracted. These wellhead assemblies may include a wide variety of components, such as various casings, valves, fluid conduits, and the like, that control drilling or extraction operations.

Additionally, such wellhead assemblies may use a fracturing tree and other components to facilitate a fracturing process and enhance production from a well. As will be appreciated, resources such as oil and natural gas are generally extracted from fissures or other cavities formed in various subterranean rock formations or strata. To facilitate extraction of such resources, a well may be subjected to a fracturing process that creates one or more man-made fractures in a rock formation. This facilitates, for example, coupling of pre-existing fissures and cavities, allowing oil, gas, or the like to flow into the wellbore. Such fracturing processes typically include injecting a fracturing fluid—which is often a mixture including sand and water—into the well to increase the well's pressure and form the man-made fractures. A fracturing manifold may provide fracturing fluid to one or more fracturing trees via fracturing lines (e.g., pipes). But the fracturing manifolds and associated fracturing trees are typically large and heavy, and may be mounted to other equipment at a fixed location, making adjustments between the fracturing manifold and a fracturing tree difficult.

SUMMARY

Certain aspects of some embodiments disclosed herein are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

Embodiments of the present disclosure generally relate to fracturing systems having a fracturing manifold. In one embodiment, a fracturing system includes a fracturing manifold coupled to multiple fracturing trees via fluid conduits such that each of the multiple fracturing trees is coupled to the fracturing manifold by one or more rigid conduits. Goat heads may also be used to facilitate connection of the fracturing manifold to the fracturing trees. In some instances, a fracturing manifold includes a trunk line for providing fracturing fluid to multiple outlet branches of the manifold. Further, the multiple outlet branches can include valves for controlling flow of fracturing fluid toward wells from the trunk line.

Various refinements of the features noted above may exist in relation to various aspects of the present embodiments. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of the some embodiments without limitation to the claimed subject matter.

BRIEF DESCRIPTION OF THE DRAWINGS

These and other features, aspects, and advantages of certain embodiments will become better understood when the following detailed description is read with reference to the accompanying drawings in which like characters represent like parts throughout the drawings, wherein:

FIG. 1 generally depicts an adjustable fracturing system in accordance with an embodiment of the present disclosure;

FIG. 2 is a diagram of the adjustable fracturing system of FIG. 1 with a fracturing manifold coupled to multiple fracturing trees in accordance with an embodiment of the present disclosure;

FIG. 12 generally depicts one pipe of the fluid conduit of FIG. 11 as having a swivel connection on one end that allows rotation of the pipe with respect to another portion of the fluid conduit in accordance with one embodiment.

DETAILED DESCRIPTION OF SPECIFIC EMBODIMENTS

Figure 3:
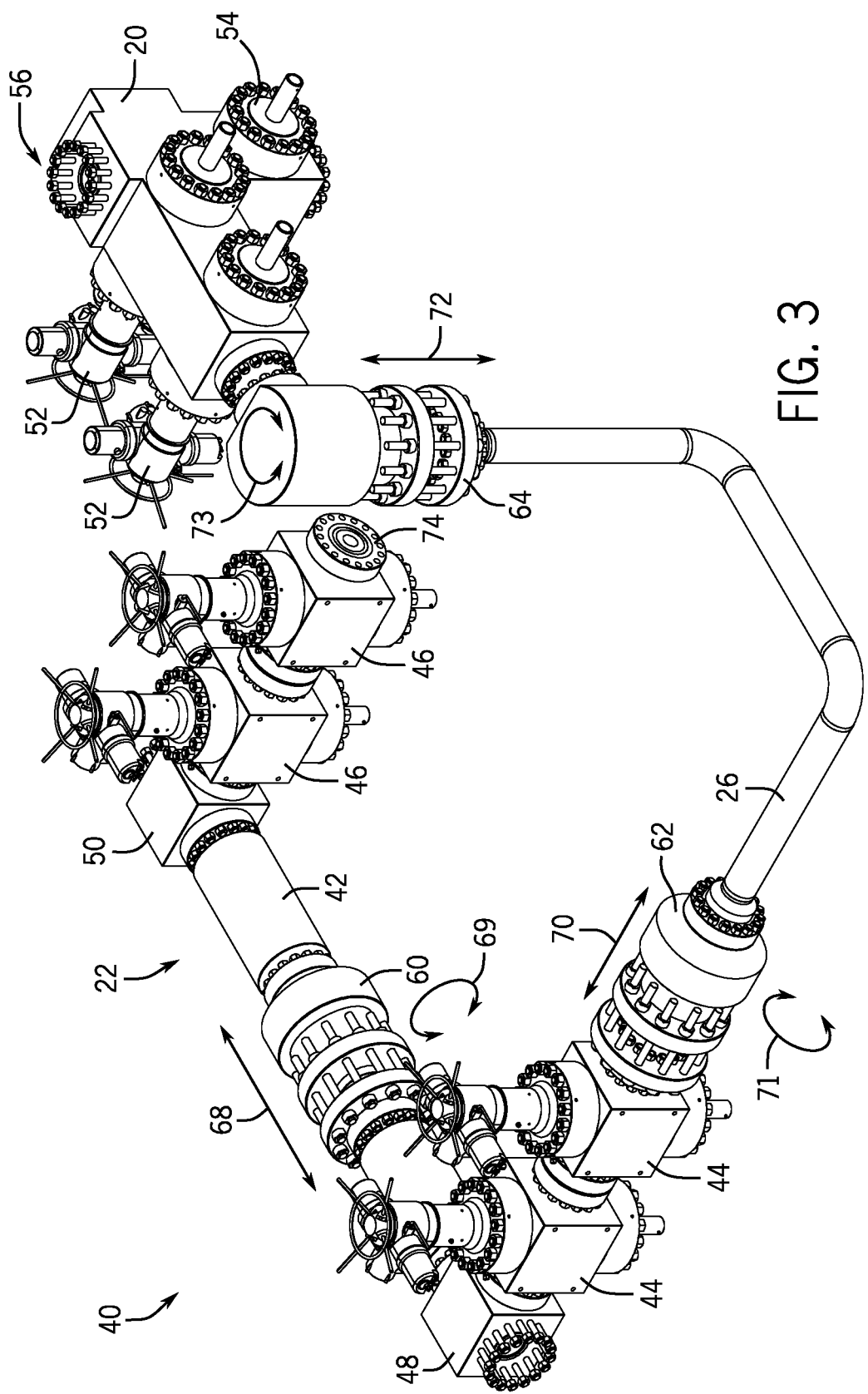
FIG. 3 is a perspective view of certain components of the adjustable fracturing system, including the fracturing manifold, one fracturing tree, and several adjustment joints in accordance with an embodiment of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments, the articles "a," "an," "the," and "said" are intended to mean that there are one or more of the elements. The terms "comprising," "including," and "having" are intended to be inclusive and mean that there may be additional elements other than the listed elements. Moreover, any use of "top," "bottom," "above," "below," other directional terms, and variations of these terms is made for convenience, but does not require any particular orientation of the components.

Turning now to the present figures, an example of a fracturing system 10 is provided in FIGS. 1 and 2 in accordance with one embodiment. The fracturing system 10 facilitates extraction of natural resources (e.g., oil or natural gas) from a well 12 via a wellbore 14 and a wellhead 16. Particularly, by injecting a fracturing fluid into the well 12, the fracturing system 10 increases the number or size of fractures in a rock formation or strata to enhance recovery of natural resources present in the formation. In the presently illustrated embodiment, the well 12 is a surface well accessed by equipment of wellhead 16 installed at surface level (i.e., on ground 18). But it will be appreciated that natural resources may be extracted from other wells, such as platform or subsea wells.

The fracturing system 10 includes various components to control flow of a fracturing fluid into the well 12. For instance, the depicted fracturing system 10 includes a fracturing tree 20 and a fracturing manifold 22. The fracturing tree 20 includes at least one valve that controls flow of the fracturing fluid into the wellhead 16 and, subsequently, into the well 12. Similarly, the fracturing manifold 22 includes at least one valve that controls flow of the fracturing fluid to the fracturing tree 20 by a conduit or fluid connection 26 (e.g., pipes).

The fracturing manifold 22 is mounted on at least one skid 24 (e.g., a platform mounted on rails) to enable movement of the fracturing manifold 22 with respect to the ground 18. As depicted in FIG. 2, the fracturing manifold 22 is connected to provide fracturing fluid to multiple fracturing trees 20 and wellheads 16. But it is noted that the fracturing manifold 22 may instead be coupled to a single fracturing tree 20 in full accordance with the present techniques. In one embodiment in which the fracturing manifold 22 is coupled to multiple fracturing trees 20, various valves of the fracturing manifold 22 may be mounted on separate skids 24 to enable variation in the spacing between the valves. And in at least some instances, as described in further detail below, such a configuration allows for easier alignment of the fluid connection 26 between the fracturing manifold 22 and the fracturing tree 20.

Fracturing fluid from a supply 28 is provided to the fracturing manifold 22. In FIG. 1, a connector 30 receives fracturing fluid from the supply 28 through a conduit or fluid connection 32 (e.g., pipes or hoses) and then transmits the fluid to the fracturing manifold 22 by way of a subterranean conduit or fluid connection 34 (e.g., pipes). In one embodiment, the fracturing fluid supply 28 is provided by one or more trucks that deliver the fracturing fluid, connect to the connector 30, and pump the fluid into the fracturing manifold 22 via the connector 30 and connections 32 and 34. In another embodiment, the fracturing fluid supply 28 is in the form of a reservoir from which fluid may be pumped into the fracturing manifold 22. But any other suitable sources of fracturing fluid and manners for transmitting such fluid to the fracturing manifold may instead be used.

A portion 40 of the fracturing system 10 is illustrated in FIG. 3 in accordance with one embodiment. In the depicted embodiment, the portion 40 includes the fracturing tree 20 and the fracturing manifold 22, as well as several adjustment joints that enable alignment of the connection line (i.e., fluid connection 26) between the fracturing tree 20 and the fracturing manifold 22. The manifold 22 includes a conduit 42 that routes fracturing fluid to valves 44 and 46. These valves 44 and 46 are coupled to connecting blocks 48 and 50 of the conduit 42 to receive fracturing fluid from the fluid supply 28 via connections 32 and 24. The fracturing fluid may then be routed through fluid connection 26 to a respective fracturing tree 20. Although the present embodiment includes two valves 44 and two valves 46, any other suitable number of valves may instead be used to control flow of fracturing fluid to fracturing trees 20. Further, while the depicted fluid connection 26 includes a single flow path or conduit (which may be a fracturing line with a seven-inch bore in one instance) between the fracturing tree 20 and the fracturing manifold 22, a fracturing system may include a greater number of conduits between the fracturing manifold and a fracturing tree in other embodiments.

The fracturing tree 20 is provided in the form of a horizontal fracturing tree in FIG. 3, though other embodiments may include a different style of fracturing tree (e.g., a vertical tree). The depicted fracturing tree 20 includes valves 52 to control flow of fracturing fluid through a horizontal portion of the tree 20. The tree 20 also includes a master valve 54 to control flow of fluids (e.g., fracturing fluids or production fluids) to or from the attached wellhead 16 (FIG. 1), and a port 56 allowing access to the wellhead 16 through the master valve 54. In other embodiments, the valve 54 may be omitted (e.g., in a composite tree arrangement with all valves integral to one block).

The portion 40 of the fracturing system 10 also includes extendable adjustment joints that facilitate connection of the fracturing manifold 22 to the fracturing tree 20. In the presently illustrated embodiment, the adjustment joints are provided in the form of adjustable fracturing heads 60, 62, and 64 (also commonly referred to as "goat heads"), though other forms of adjustment joints are also envisaged and may be used in accordance with the present techniques. In operation, the fracturing tree 20 may be mounted at a fixed location (i.e., coupled to the wellhead 16). The fluid connection 26 is aligned and coupled between the fracturing tree 20 and the fracturing manifold 22. The adjustment joints (e.g., the fracturing heads 60, 62, and 64 in FIG. 3) facilitate such alignment and coupling of the fluid connection by allowing an operator to manipulate the position of the fluid connection 26 by changing a dimension (e.g., length or height) of the adjustment joint. By providing three adjustment joints, each with a different axis of movement (i.e., up-and-down, forward-and-backward, and left-and-right), adjustments can be made to help facilitate coupling of the fracturing manifold 22 to the fracturing tree 20.

For example, the conduit 42 includes a fracturing head 60 that may be extended or retracted (as represented by arrow 68) to vary the length of the conduit 42 and the distance between the valves 44 and 46 (which may be mounted on separate skids 24, as discussed above, to allow relative motion between the valves 44 and 46). Such variation also provides a first degree of freedom in aligning the fluid connection 26 between the fracturing tree 20 and the fracturing manifold 22. In other words, the adjustment joint in conduit 42 allows the distance between the seal points of the fluid connection 26 at the fracturing tree 20 and at the fracturing manifold 22 to be varied in a first dimension.

Likewise, the fluid connection 26 in FIG. 3 includes the fracturing head 62 to vary the length of the fluid connection 26 in a second dimension, as represented by arrow 70. The adjustability of the fracturing head 62 provides a second degree of freedom in aligning the connection between the fracturing tree 20 and the fracturing manifold 22. Further, the portion 40 includes the fracturing head 64 having a variable length in a third dimension (as represented by arrow 72), thus providing a third degree of freedom in aligning the fluid connection 26 between the fracturing tree 20 and the fracturing manifold 22. These three degrees of freedom are provided by three adjustment joints having different directions of adjustment that are not parallel, and in some embodiments (such as in FIG. 3) the directions of adjustment are orthogonal to one another. In addition to these three translational degrees of freedom, one or more of the adjustment joints (e.g., fracturing heads 60, 62, and 64) may also be rotated about their axes, as indicated by arrows 69, 71, and 73, to provide rotational degrees of freedom. For example, the presently depicted embodiment provides six degrees of freedom (three translational and three rotational).

While large fracturing lines (e.g., with a seven-inch bore) are traditionally difficult to adjust between a fracturing manifold and a fracturing tree, the adjustability provided in the presently disclosed system 10 enables large fracturing lines to be aligned and connected to such components more efficiently. Consequently, as depicted in FIG. 3, a single fluid connection 26 may be provided in the form of a large-bore fracturing line, rather than using multiple smaller-bore fracturing lines between the fracturing manifold and a given fracturing tree.

While the presently depicted embodiment includes three adjustment joints, it is noted that other embodiments may include fewer adjustment joints providing fewer degrees of freedom in aligning the fluid connection 26. For instance, a single adjustment joint may be provided to give one translational degree of freedom (e.g., up-and-down, forward-and-backward, or left-and-right) in aligning the fracturing tree 20 and the fracturing manifold 22 for the fluid connection 26. Or two adjustment joints may be provided to give two translational degrees of freedom. Such adjustment joints may also provide rotational degrees of freedom as noted above. Further still, multiple adjustment joints may be aligned coaxially to provide adjustability at different locations within the system 10 (e.g., the manifold 22 may include multiple, coaxial adjustment joints).

For clarity, only a single fluid connection 26 and a single fracturing tree 20 (both of which receive fracturing fluid from the valves 44) are depicted in FIG. 3 as part of portion 40 of the fracturing system 10. But it will be appreciated that the fracturing system 10 may include additional fluid connections 26 and fracturing trees 20 (see, e.g., FIG. 2). For example, valves 46 may be coupled (e.g., via outlet 74) to another fluid connection 26 leading to a different fracturing tree 20 on another wellhead 16. Further, the conduit 42 may extend beyond the depicted connection blocks 48 and 50 to route fracturing fluid to additional valves and associated fracturing trees 20. And the conduit 42 may include additional adjustment joints to enable movement of such additional valves relative to another portion of the manifold 22, thereby facilitating alignment of these valves with their associated fracturing trees 20.

Figure 4:
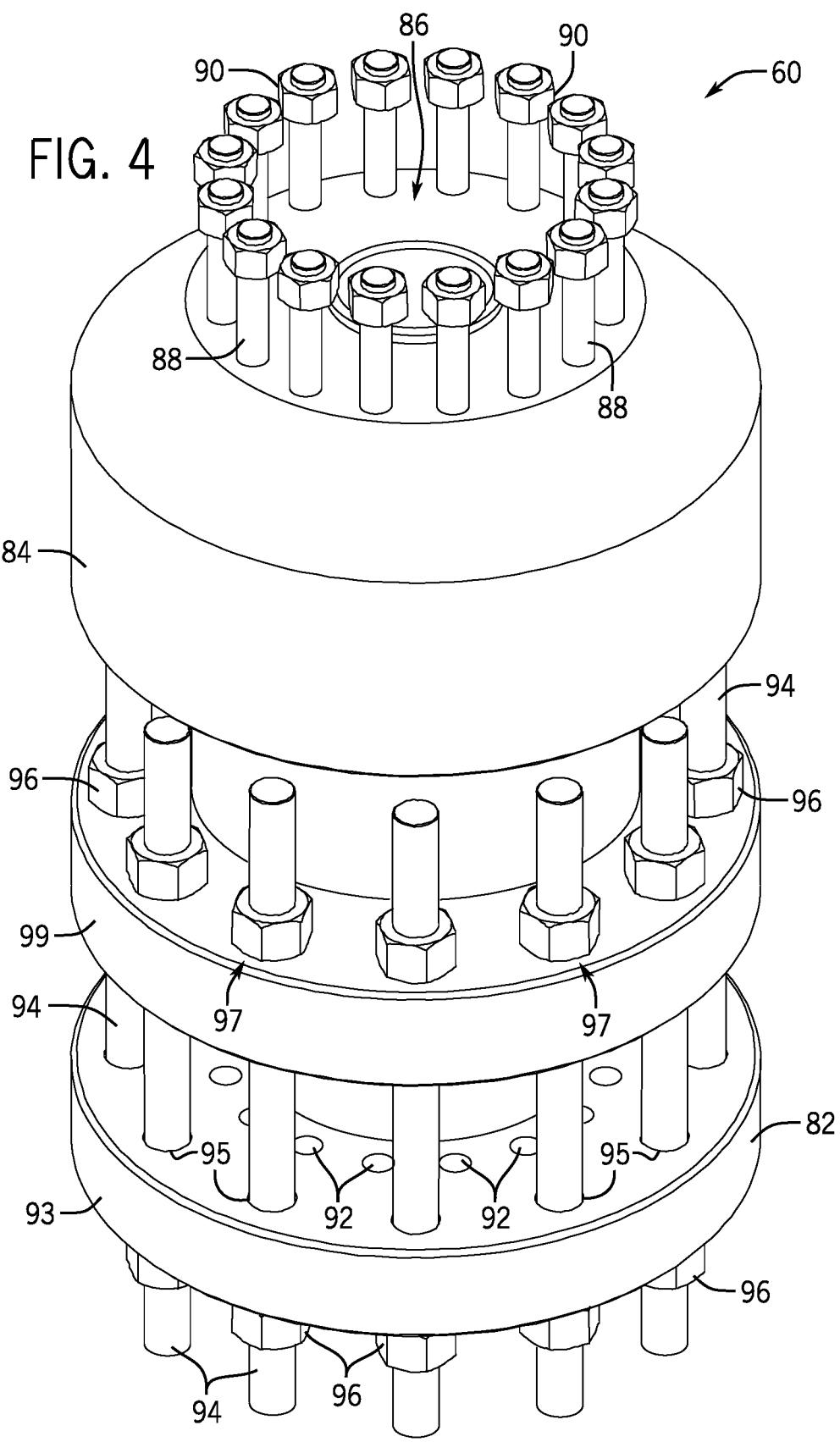
FIG. 4 is a perspective view of an adjustment joint in the form of a fracturing head in accordance with an embodiment of the present disclosure.
Figure 5:
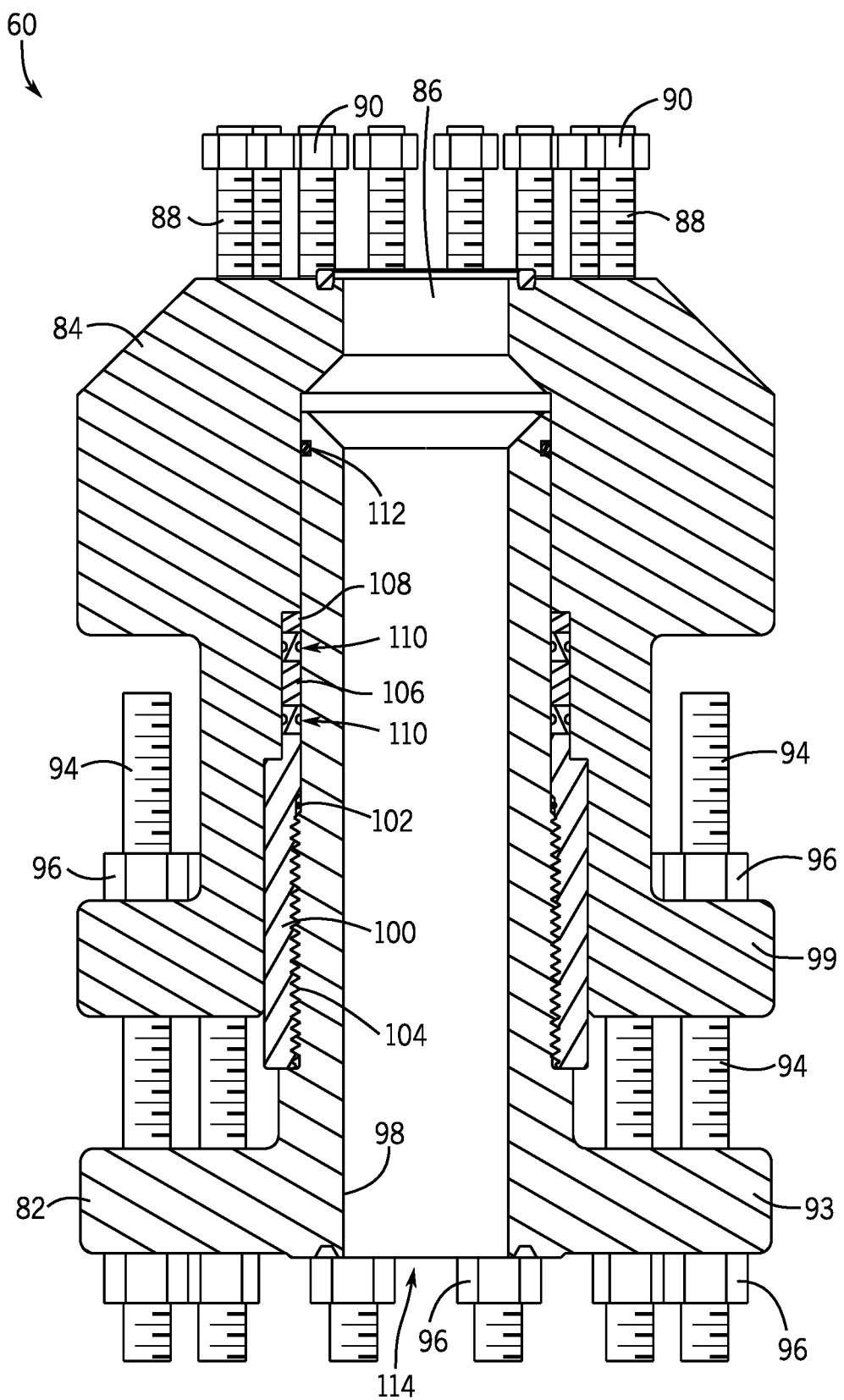
FIG. 5 is a cross-section of the fracturing head of FIG. 4 in accordance with an embodiment of the present disclosure.
Figure 6:
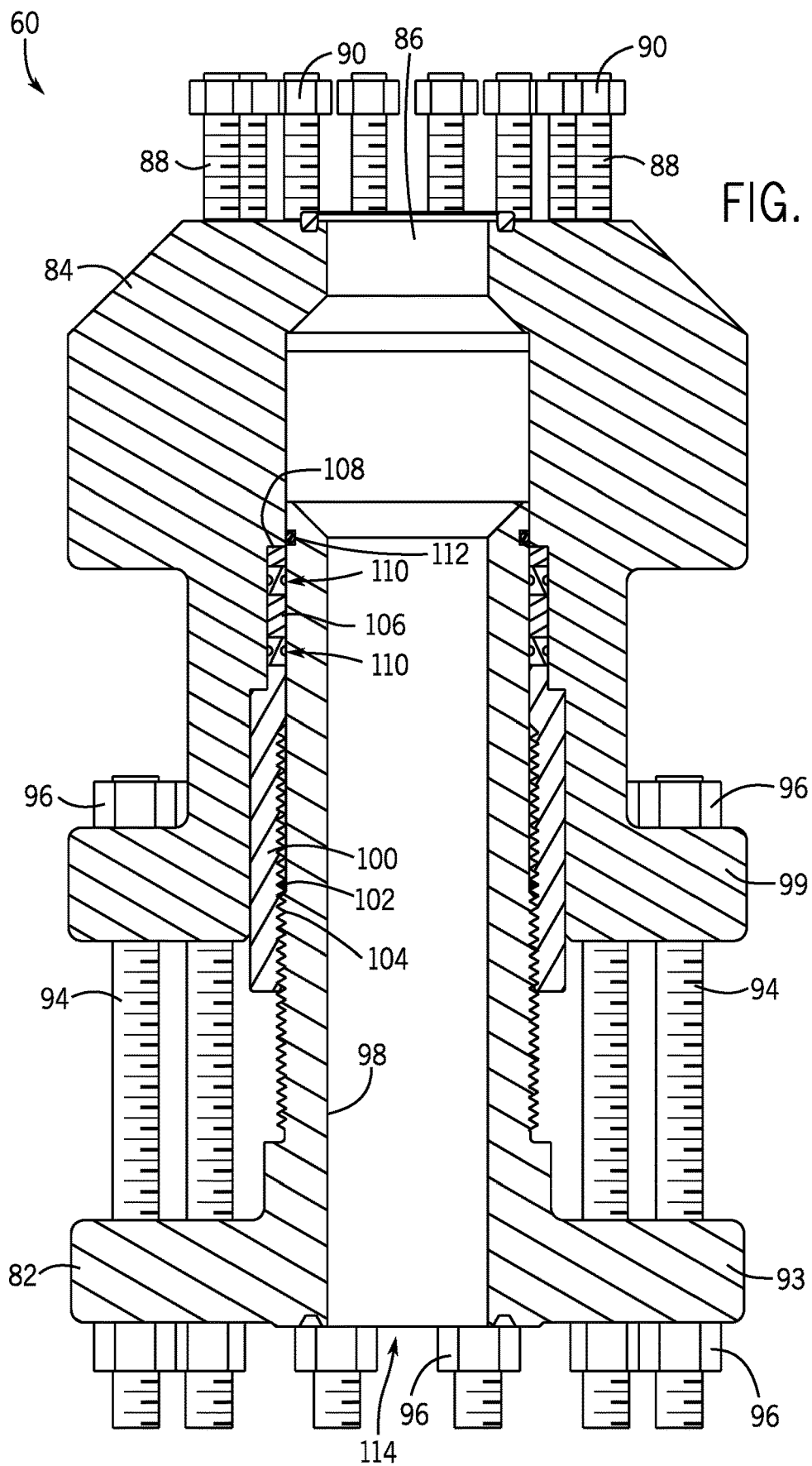
FIG. 6 generally depicts the fracturing head of FIGS. 4 and 5 following adjustment of the fracturing head to increase its length in accordance with an embodiment of the present disclosure.

The fracturing head 60, in accordance with one embodiment, is illustrated in greater detail in FIGS. 4-6. In the depicted embodiment, the fracturing head 60 includes a body having a first portion 82 and a second portion 84. The body portions 82 and 84 are configured to move with respect to one another to vary a dimension of the fracturing head and facilitate connection of the fracturing manifold 22 and the fracturing tree 20 as described above. The fracturing head 60 includes fluid ports 86 and 114 (FIG. 5) to transmit fluid through the fracturing head 60. In some embodiments, such as when installed in the fracturing system 10 in the manner depicted in FIG. 3, the fluid port 86 may be considered an output port and the fluid port 114 may be considered an inlet port. In addition to the fluid port 86, the second body portion 84 includes a set of studs 88 and nuts 90 for connecting the fracturing head 60 to another component (e.g., via an API flange or other connector). Similarly, the first body portion 82 includes through holes 92 arranged in a flange 93 about the fluid port 114 for coupling to another component (e.g., also coupled to an API flange via additional studs and nuts or to another connector). The first body portion 82 includes an additional set of through holes 95 positioned radially outward from the through holes 92. The through holes 95 are aligned with mating holes 97 in a flange 99 of the second body portion 84, and the first and second body portions 82 and 84 are secured to one another with studs 94 (through the holes 95 and 97) and nuts 96.

As depicted in FIGS. 5 and 6, a bore 98 extends through the fracturing head 60 between the fluid ports 86 and 114. The bore 98 may have a diameter similar or identical to that of the components coupled to the fluid ports 86 and 114, such as seven inches in one embodiment (though other diameters may be used for the bore 98, as well as for other components). The bore may also be sized to match the inner diameter of the production casing in the well (i.e., a full bore arrangement) to facilitate the passage of tools, plugs, or the like through the fracturing head 60. The fracturing head 60 includes an adjustment collar 100 that may be rotated on threads 104 by a user to translate the collar 100 with respect to the body portion 82 or 84 of the fracturing head 60 on which the collar is threaded (i.e., first body portion 82 in FIGS. 5 and 6). Movement of the adjustment collar 100 allows adjustment of the length of the fracturing head 60 and the distance between fluid ports 86 and 114. Particularly, as illustrated in FIG. 6, nuts 96 may be loosened on the studs 94 and the adjustable collar 100 may be moved along the first body portion 82 to lengthen the fracturing head 60. In this manner, the length (or what may instead be considered the height) of the fracturing head 60 may be varied to aid in aligning and coupling the fracturing manifold 22 and the fracturing tree 20 via the fluid connection 26, as discussed above. The fracturing head 60, as well as other adjustment joints in the system 10 (e.g., the fracturing heads 62 and 64 or the pipe connector 130 of FIG. 9), may be constructed to allow for any desired amount of variation in dimension. For instance, the adjustment joints may be constructed to allow dimensional variation (e.g., lengthening) of seven inches in one embodiment, of twelve inches in another embodiment, and of eighteen inches in still another embodiment. Still further, it is noted that in addition to the translational and rotational degrees of freedom facilitated through use of the presently disclosed adjustment joints, angular adjustment between elements of the fracturing system 10 can be enabled through the inclusion of pivot joints or other suitable couplings.

The fracturing head 60 also includes various sealing elements to inhibit fluid leakage. For instance, as depicted, fracturing head 60 includes sealing elements 102, 106, 108, 110, and 112. The sealing elements are formed of any suitable material, such as an elastomer or metal. In one embodiment, the seals 110 include CANH™ seals available from Cameron International Corporation of Houston, Tex. Also, in one embodiment movement of the collar 100 pre-loads or energizes one or more of the seals of the fracturing head 60.

Figure 7:
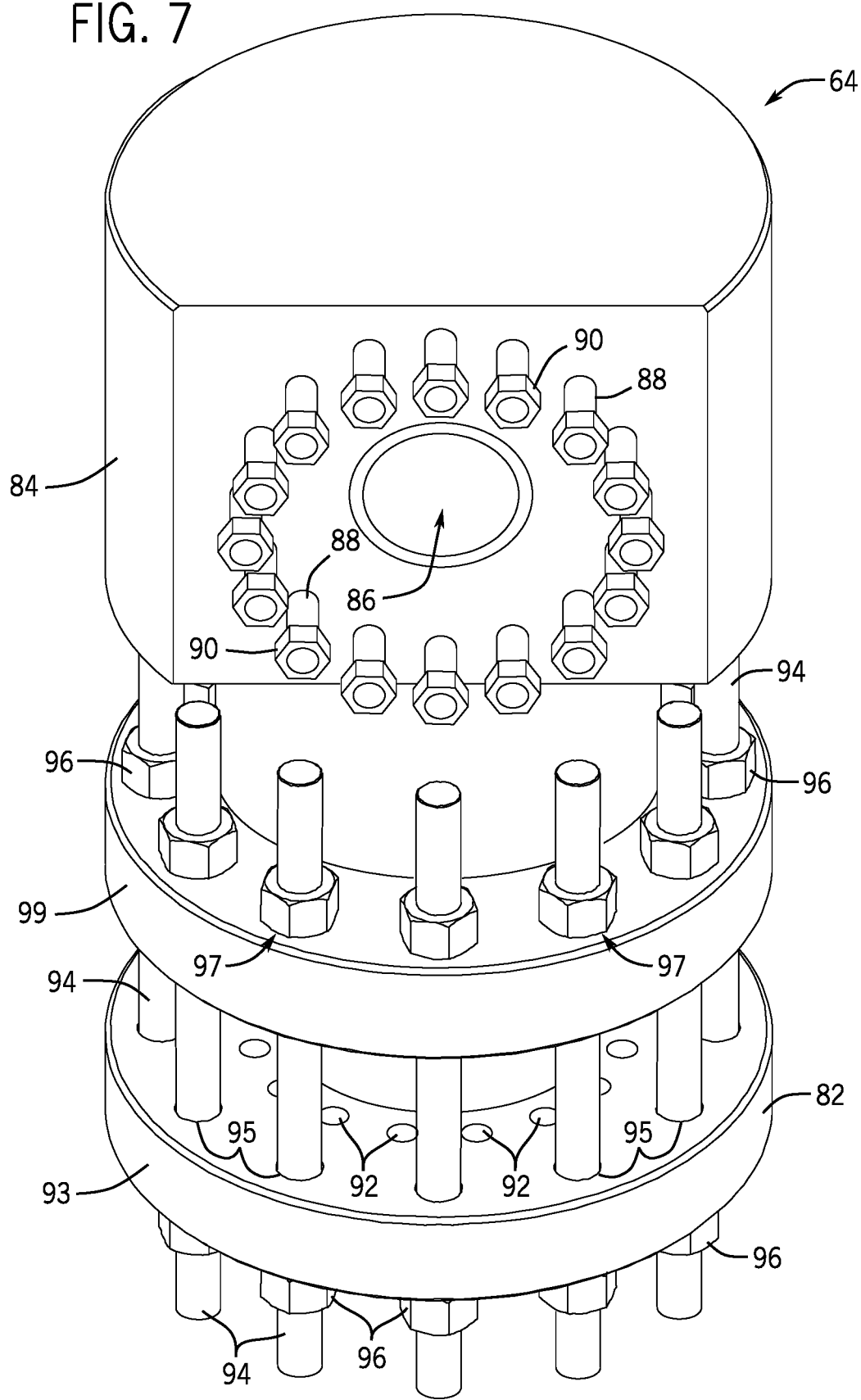
FIG. 7 is a perspective view of an adjustment joint in the form of a fracturing head having inlet and outlet ports that are not axially aligned with each other in accordance with an embodiment of the present disclosure.

As depicted in FIG. 7, the fracturing head 64 is generally similar to the fracturing head 60 (and the fracturing head 62, which is identical to the fracturing head 60 in one embodiment) but includes a fluid port 86 on a side face of the body portion 84 rather than on the top face. As illustrated in FIG. 3, such an arrangement enables the fracturing head 64 to connect a pipe of fluid connection 26 with the fracturing tree 20 via a bore bent at an angle (e.g., at a right angle) to change the direction of fluid flowing through the fracturing head 64. And a dimension of the fracturing head 64 may be varied in the same manner as described above with respect to fracturing head 60, thereby facilitating alignment and coupling of the fracturing tree 20 and the fracturing manifold 22 with the fluid connection 26.

Figure 8:
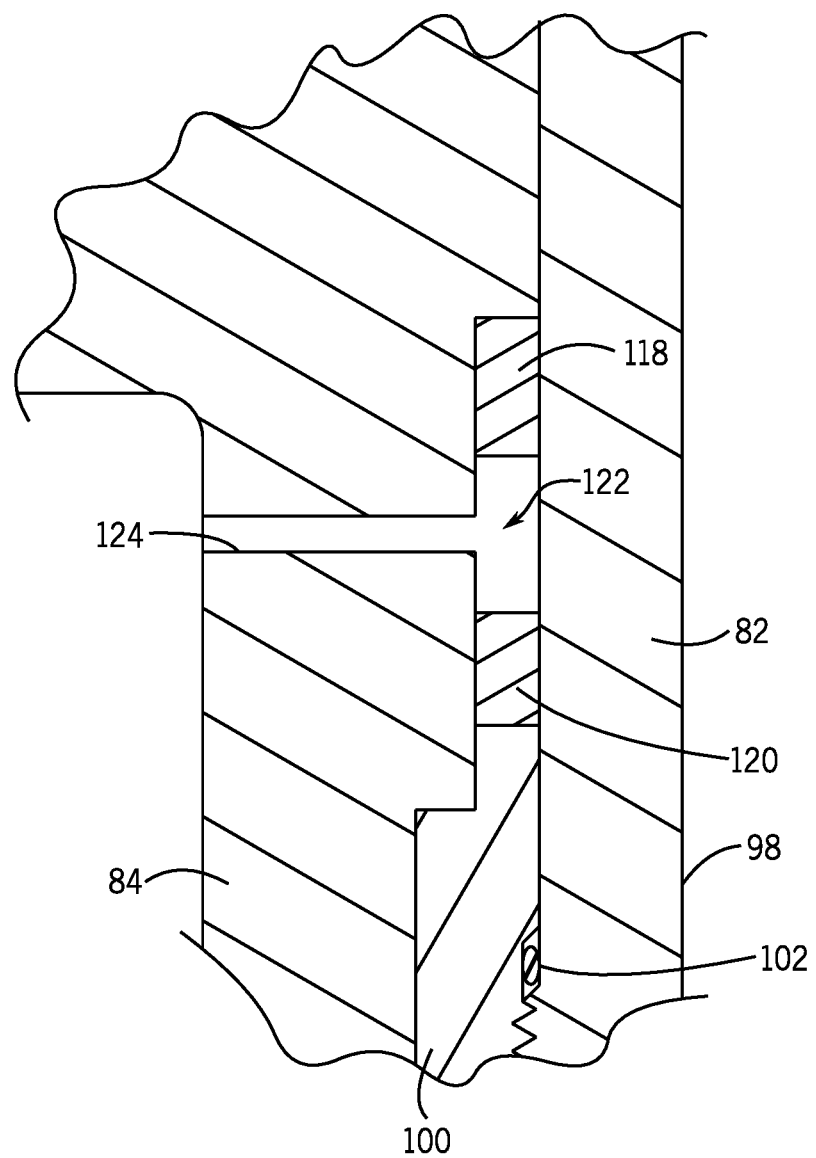
FIG. 8 is a partial cross-section of a fracturing head including a test port to enable integrity testing between two seals of the fracturing head in accordance with an embodiment of the present disclosure.

In one embodiment illustrated in FIG. 8, a fracturing head (e.g., fracturing head 60, 62, or 64) includes seals 118 and 120 (rather than sealing elements 106, 108, and 110) disposed in an annular space 122. The seals 118 and 120 are formed of any suitable material, and may include metal CANH™ seals in one embodiment. The annular space 122 is bound by the body portion 82, the body portion 84, and the adjustable collar 100. A test port 124 extends from the annular space 122 (e.g., at a location between the seals 118 and 120) to an exterior surface of the body portion 84 to allow connection of a pressure monitoring device to enable monitoring or testing of the integrity of the seals 118 and 120.

Figure 9:
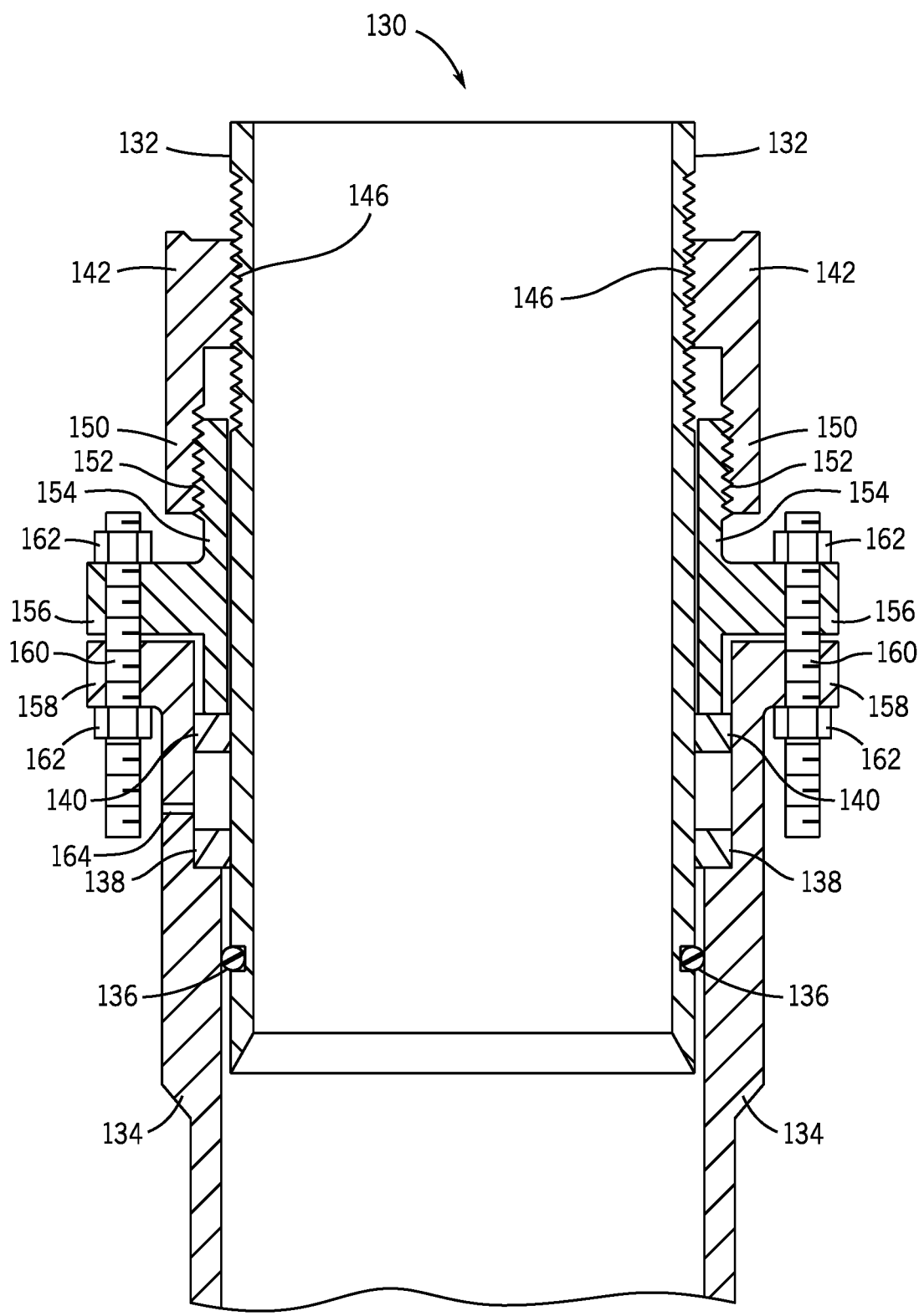
FIG. 9 is a cross-section of an adjustment joint in the form of a pipe connector having a length that may be varied in accordance with an embodiment of the present disclosure.

While the adjustment joints of the fracturing system 10 have been described above in the form as fracturing heads, other embodiments may use other adjustment joints in addition to, or in place of, the fracturing heads. For example, one or more of the fracturing heads 60, 62, and 64 of FIG. 3 may be replaced by other adjustment joints in additional embodiments. One example of another adjustment joint is depicted in FIG. 9 in the form of a pipe connector 130. The connector 130 includes a first tubular member 132 and a second tubular member 134. The tubular members 132 and 134 may be pipes (e.g., of the fluid connection 26 or conduit 42), or they may be coupled to pipes or other conduits in any suitable fashion. The opposite ends of the connector include an inlet and an outlet, allowing fracturing fluid to flow through the connector 130 via the bores of either the members 132 and 134 themselves or of the pipes or other conduits joined by the connector 130.

The connector 130 is configured to enable relative movement between the tubular members 132 and 134 to allow variation in the length of the connector 130. Like the fracturing heads 60, 62, and 64, the connector 130 may be constructed to allow any desired range of variation in length, such as a range of seven inches or twelve inches. Various seals 136, 138, and 140 are provided between the tubular members 132 and 134. In one embodiment, the seal 136 is an elastomeric seal and the seals 138 and 140 are metal CANH™ seals.

The connector 130 also includes a collar 142 (which may also be referred to herein as union nut 142) that cooperates with a flanged collar 154 to adjust the length of the connector 130. The union nut 142 may be coupled to the first tubular member 132 in any suitable manner. In the depicted embodiment, threads 146 allow the union nut 142 to be threaded onto the tubular member 132. The union nut 142 includes an end 150 that engages the collar 154 via threads 152, and rotation of the union nut 142 causes the collar 154 to move along the axis of the connector 130 with respect to the tubular member 132. A flange 156 of the collar 154 is coupled to a mating flange 158 of the tubular member 134 by studs 160 and nuts 162. Consequently, rotation of the union nut 142 also causes the second tubular member 134 to be moved with respect to the first tubular member 132, thereby enabling the connector 130 to be lengthened or shortened through such operation. The connector 130 may also include a test port 164 to enable monitoring of the integrity of seals 138 and 140 in a manner similar to that described above with respect to test port 124 (FIG. 8).

Figure 10:
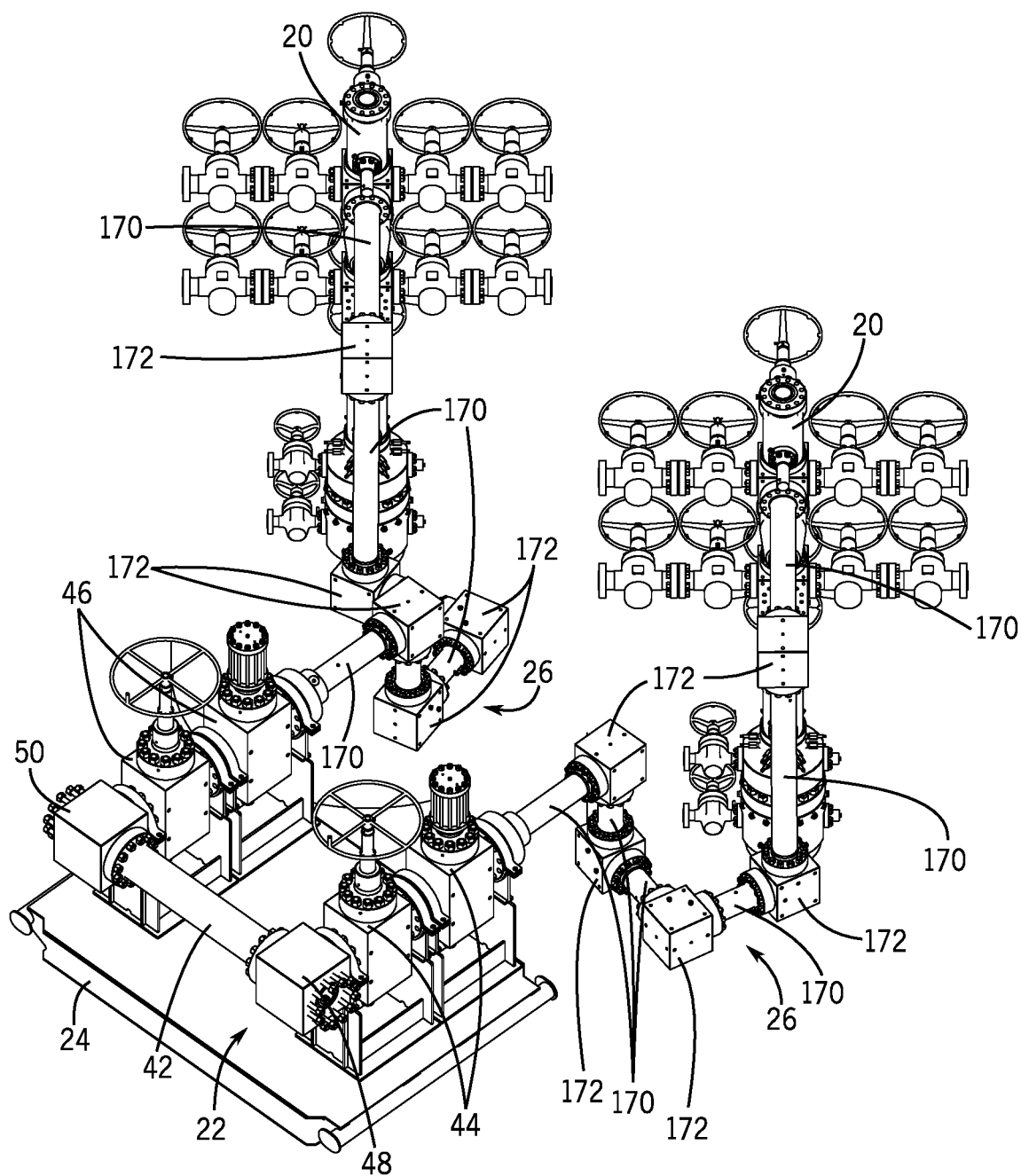
FIG. 10 is a perspective view of certain components of an adjustable fracturing system, including fluid conduits having multiple pipes connected between the fracturing manifold and two fracturing trees, in accordance with an embodiment of the present disclosure.

Another embodiment in which fluid conduits 26 are adjustable to facilitate coupling of the fluid conduits 26 between the fracturing manifold 22 and fracturing trees 20 is generally depicted in FIG. 10. In this embodiment, the adjustment joints for the fracturing system are provided in the form of rotatable pipe joints 170 and connection blocks 172 (e.g., elbow blocks) of the fluid conduits 26. The ability to rotate components of the fluid conduits 26 provides rotational degrees of freedom similar to those described above, and enables the fluid conduits 26 to be more easily positioned and connected between the fracturing manifold 22 and the fracturing trees 20. As presently illustrated, the fluid conduits 26 with rotatable components have three rotational degrees of freedom, although other embodiments could have fewer than three. In some instances, the adjacent pipes 170 and connection blocks 172 could be rotated to desired positions before assembling these components together (e.g., via a studded connection). But in at least some embodiments, the fluid conduit 26 includes a swivel connection that enables rotation of one portion of the fluid conduit 26 with respect to another portion of the fluid conduit 26 while those portions are connected to one another.

Figure 11:
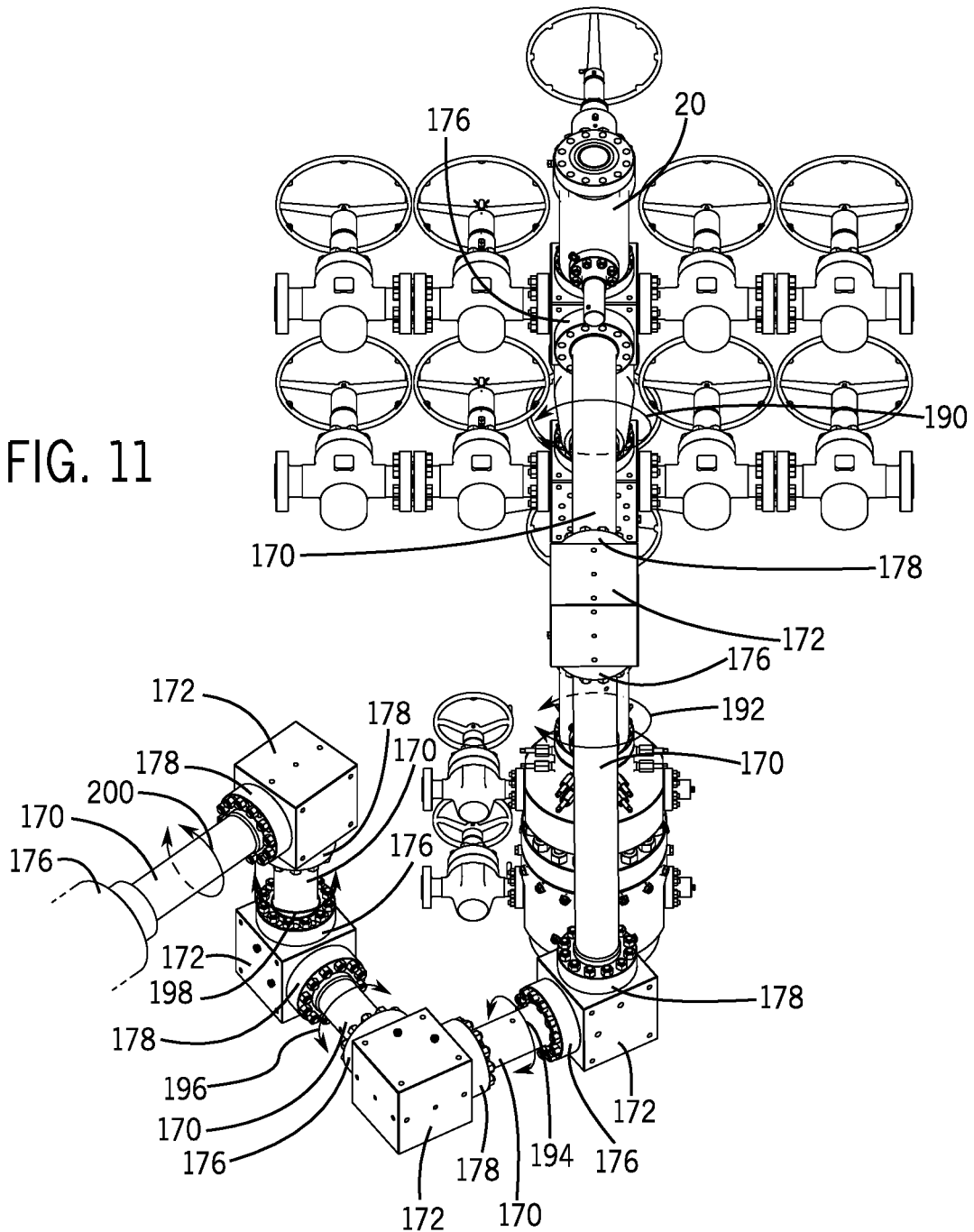
FIG. 11 is a detail view of one of the fluid conduits of FIG. 10.

One example of such an arrangement is depicted in FIG. 11. In this embodiment, the fluid conduit 26 includes a number of swivel connections (having swivel rings 176) that allow pipes 170 and connection blocks 172 to rotate with respect to one another. Each pipe 170 is depicted in FIG. 11 as having a swivel connection (with a swivel ring 176) at one end and a fixed, non-swivel connection (with a threaded flange 178) at its other end, although fewer pipes 170 could have swivel connections in other embodiments.

An example of a pipe 170 having such connections is depicted in greater detail in FIG. 12 in accordance with one embodiment. In this example, the pipe 170 includes a flange 182 at one end and a threaded surface 184 at its other end. When the pipe 170 is assembled in the fluid conduit 26, the flange 182 is received within the swivel ring 176. This allows the flange 182 (along with the pipe 170) to rotate with respect to the swivel ring 176 and to the component to which the swivel ring 176 is attached (e.g., a connection block 172, the fracturing manifold 22, or a fracturing tree 20). The threaded flange 178 can be connected to the threaded surface 184 to allow that end of the pipe 170 to also be connected to another component of the fluid conduit 26. As depicted, the swivel ring 176 and the threaded flange 178 include through holes 188 to allow them to be connected to other components via studded connections. But other kinds of connections could also be used in accordance with the present technique.

Returning now to FIG. 11, it can be seen that the swivel connections enable the rotation of the pipes 170 and the connection blocks 172, as generally represented by arrows 190, 192, 194, 196, 198, and 200. The swivel connection at one end of a pipe 170 allows the pipe 170 to be rotated about its axis to change the orientation of the connection block 172 (which rotates with the pipe 170) coupled to the pipe 170 at the fixed connection opposite the swivel. And through the rotation of these components, overall dimensions of the fluid conduit 26 can be changed to accommodate variances in distances and elevations between the fracturing manifold 22 and the fracturing trees 20. That is, by rotating the various components of the fluid conduit 26, the pipes 170 may be extended and retracted to position the fluid conduit 26 appropriately for coupling between the fracturing manifold 22 and a fracturing tree 20.

Like some other embodiments described above, the fracturing system depicted in FIG. 11 uses only a single fluid conduit 26 per fracturing tree 20 rather than using multiple, smaller fluid conduits. In one embodiment, the bore of the fluid conduit is seven and one-sixteenth inches at the end of the conduit 26 that receives fracturing fluid from the manifold 22 and is five and one-eighth inches at the end of the conduit 26 connected to the fracturing tree. But it will be appreciated that conduits 26 may have different dimensions in other embodiments. Additionally, although the pipes 170 are shown connected orthogonally to one another via the connection blocks 172 in the present embodiment, other embodiments could include pipes 170 connected to one another at different angles.

While the aspects of the present disclosure may be susceptible to various modifications and alternative forms, specific embodiments have been shown by way of example in the drawings and have been described in detail herein. But it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A system comprising:
a fracturing manifold;
a plurality of fracturing trees; and
a plurality of fluid conduits coupled between the fracturing manifold and the plurality of fracturing trees to enable receipt of fracturing fluid by the plurality of fracturing trees from the fracturing manifold, wherein each fracturing tree of the plurality of fracturing trees coupled to the fracturing manifold is coupled to the fracturing manifold by at least one rigid fluid conduit of the plurality of fluid conduits so as to provide one and only one rigid fluid pathway from the fracturing manifold to the fracturing tree, and the one and only one rigid fluid pathway is not coupled to the fracturing manifold to provide the fracturing fluid from the fracturing manifold to any other fracturing tree; and
wherein the at least one rigid fluid conduit includes:
a first pipe that is attached to a first connection block via a first flanged connection; and
a second pipe that is in fluid communication with the first pipe and is attached to the first connection block or to a second connection block via a second flanged connection.

2. The system of claim 1, wherein the fracturing manifold includes:
a shared trunk conduit for routing fracturing fluid to multiple fracturing trees of the plurality of fracturing trees; and
outlet branches for routing fracturing fluid from the shared trunk conduit to individual fracturing trees of the multiple fracturing trees.

3. The system of claim 2, wherein the outlet branches of the fracturing manifold include valves to individually control flow of fracturing fluid from the shared trunk conduit to the multiple fracturing trees.

4. The system of claim 3, wherein the outlet branches of the fracturing manifold include:
a first outlet branch having two valves connected in series to control flow of fracturing fluid to a first fracturing tree of the multiple fracturing trees; and
a second outlet branch having two valves connected in series to control flow of fracturing fluid to a second fracturing tree of the multiple fracturing trees.

5. The system of claim 1, wherein the at least one rigid fluid conduit is an adjustable fluid conduit that allows an operator to vary a dimension of the fluid conduit to facilitate coupling of the fluid conduit between the fracturing manifold and a fracturing tree of the plurality of fracturing trees.

6. The system of claim 1, wherein the at least one rigid fluid conduit includes an adjustment joint that provides at least one translational degree of freedom in aligning the at least one rigid fluid conduit between the fracturing manifold and a fracturing tree of the plurality of fracturing trees.

7. The system of claim 1, wherein the second pipe is attached to the first connection block via the second flanged connection.

8. The system of claim 1, wherein the first pipe and the second pipe are connected orthogonally to one another via the first connection block.

9. The system of claim 1, comprising a swivel along the one and only one rigid fluid pathway from the fracturing manifold to the fracturing tree.

10. The system of claim 1, comprising a fracturing fluid supply coupled to provide fracturing fluid to the fracturing manifold.

11. A method comprising:
assembling a fracturing manifold having a trunk line for distributing fracturing fluid to multiple wells through multiple outlets of the fracturing manifold; and
connecting the fracturing manifold to the multiple wells via rigid conduits positioned to receive fracturing fluid from the multiple outlets such that the rigid conduits, for each well of the multiple wells, provide one and only one fluid pathway for fracturing fluid to flow from the fracturing manifold to the well, and the one and only one fluid pathway for each well is not shared by another well, wherein connecting the fracturing manifold to the multiple wells via rigid conduits includes connecting the fracturing manifold to a first fracturing tree with a first set of pipes and connection blocks that are connected together via flanged connections and connecting the fracturing manifold to a second fracturing tree with a second set of pipes and connection blocks that are connected together via flanged connections.

12. The method of claim 11, wherein assembling the fracturing manifold includes assembling the fracturing manifold so as to include outlet branches having valves for controlling flow of fracturing fluid from the trunk line to the multiple outlets.

13. The method of claim 11, comprising providing a swivel along the one and only one fluid pathway.

14. A system comprising:

a fracturing fluid distribution manifold;

a plurality of fracturing trees coupled to the fracturing fluid distribution manifold, wherein each fracturing tree of the plurality of fracturing trees is coupled to the fracturing fluid distribution manifold by a respective single large-bore fracturing fluid connection that includes a bore having a diameter of five-and-one-eighth inches to seven inches, that is adjustable to vary a distance between opposite ends of the fracturing fluid connection during installation to facilitate alignment and coupling of the fracturing fluid connection between the fracturing fluid distribution manifold and the fracturing tree, and that is the only fracturing fluid connection to which the fracturing tree is coupled to receive fracturing fluid.

15. The system of claim 14, wherein the fracturing fluid distribution manifold includes a trunk line and valves to control flow of fracturing fluid to each fracturing tree through its respective fracturing fluid connection.

16. The system of claim 14, wherein each respective fracturing fluid connection includes multiple pipes coupled together.

17. The system of claim 14, wherein each respective fracturing fluid connection includes an elbow.

18. The system of claim 14, wherein each respective fracturing fluid connection includes a swivel or a variable-length adjustment joint.

19. The system of claim 14, wherein each respective fracturing fluid connection includes a bore having a diameter of five-and-one-eighth inches.

20. The system of claim 14, wherein each respective fracturing fluid connection includes a bore having a diameter of seven inches.

* * * * *